US009982807B2

(12) United States Patent
Hasegawa (10) Patent No.: US 9,982,807 B2
(45) Date of Patent: May 29, 2018

(54) RESIN END-FACE BUTT JOINT, METHOD FOR WELDING THE JOINTS, AND PIPING MEMBER

(75) Inventor: Takashi Hasegawa, Gunma (JP)

(73) Assignee: KITZ SCT CORPORATION, Tokyo (JP)

( * ) Notice: Subject to any disclaimer, the term of this patent is extended or adjusted under 35 U.S.C. 154(b) by 1207 days.

(21) Appl. No.: 14/115,180

(22) PCT Filed: Jan. 17, 2012

(86) PCT No.: PCT/JP2012/050797
§ 371 (c)(1),
(2), (4) Date: Nov. 1, 2013

(87) PCT Pub. No.: WO2013/069312
PCT Pub. Date: May 16, 2013

(65) Prior Publication Data
US 2014/0069548 A1 Mar. 13, 2014

(30) Foreign Application Priority Data
Nov. 11, 2011 (JP) .................... 2011-247152

(51) Int. Cl.
*F16L 9/22* (2006.01)
*F16L 47/02* (2006.01)
(Continued)

(52) U.S. Cl.
CPC ............ *F16L 9/22* (2013.01); *B29C 65/1432* (2013.01); *B29C 65/7802* (2013.01);
(Continued)

(58) Field of Classification Search
CPC ... F16L 47/02; F16L 47/32; F16L 9/22; B29C 65/04; B29C 65/069; B29C 65/1432
(Continued)

(56) References Cited

U.S. PATENT DOCUMENTS 3,989,058 A * 11/1976 Jackson .................... F16K 3/26
137/269
4,099,706 A * 7/1978 Steele, Jr. ............. F16K 27/041
285/288.1
(Continued)

FOREIGN PATENT DOCUMENTS

JP 8-156102 6/1996
JP 9-123283 5/1997
(Continued)

OTHER PUBLICATIONS

International Search Report (ISR) dated Feb. 21, 2012 in International (PCT) Application No. PCT/JP2012/050797.

*Primary Examiner* — David E Bochna
(74) *Attorney, Agent, or Firm* — Wenderoth, Lind & Ponack, L.L.P.

(57) ABSTRACT

A resin end-face butt joint, a method for welding the joints, and a piping member ensure a sufficient clamping margin with the clamp of an ordinary welding machine, and ensure an appropriate distance between the centers even when joints having short tubular welding ring parts are welded. It is also possible to align the centers by positioning the centers along the same axis. The resin end-face butt joint includes multiple welding ring parts which communicate with a flow path within a joint base part and which are provided on the joint base part. Fastening parts are coaxial with at least one of these welding ring parts at the outer end of the joint for the purpose of clamping a welding machine.

16 Claims, 6 Drawing Sheets

(51) Int. Cl.
*B29C 65/78* (2006.01)
*B29C 65/00* (2006.01)
*F16L 43/00* (2006.01)
*B29C 65/14* (2006.01)

(52) U.S. Cl.
CPC ...... *B29C 65/7808* (2013.01); *B29C 65/7844* (2013.01); *B29C 66/1142* (2013.01); *B29C 66/5221* (2013.01); *B29C 66/52231* (2013.01); *B29C 66/52241* (2013.01); *B29C 66/73921* (2013.01); *F16L 43/008* (2013.01); *F16L 47/02* (2013.01); *B29C 65/1412* (2013.01); *B29C 66/71* (2013.01); *B29C 66/8322* (2013.01)

(58) Field of Classification Search
USPC ........................................................ 285/288.1

See application file for complete search history.

(56) References Cited

U.S. PATENT DOCUMENTS

| | | | | |
|---|---|---|---|---|
| 4,128,203 | A | * | 12/1978 | Maltby ............... B60H 1/00485 137/80 |
| 4,380,251 | A | * | 4/1983 | Weaver ............... F16K 11/0655 137/15.18 |
| 5,397,155 | A | * | 3/1995 | Inda ....................... F16L 47/32 285/179 |
| 5,793,017 | A | | 8/1998 | Yamada et al. |
| 5,890,747 | A | * | 4/1999 | Brockhage ............ F16L 39/005 285/288.1 |
| 5,975,590 | A | * | 11/1999 | Cowan .................... F16L 13/02 285/288.1 |
| 7,681,924 | B2 | * | 3/2010 | Temple ............... B29C 65/2092 285/288.1 |

FOREIGN PATENT DOCUMENTS

| | | | | |
|---|---|---|---|---|
| JP | 2004-216859 | | 8/2004 | |
| WO | WO 2013069312 A1 | * | 5/2013 | ............. F16L 47/02 |
| WO | WO 2016063361 A1 | * | 4/2016 | ............. F16L 47/02 |

* cited by examiner

RESIN END-FACE BUTT JOINT, METHOD FOR WELDING THE JOINTS, AND PIPING MEMBER

BACKGROUND OF THE INVENTION

Technical Field

The present invention relates to a resin end-face butt joint, a method for welding the joints, and a piping member that are used in the semiconductor industry, food industry, pharmaceutical industry, biotech industry, chemical industry, etc.

Background Art

Piping materials used in the semiconductor industry, food industry, pharmaceutical industry, biotech industry, chemical industry, etc. are required to have chemical resistance, heat resistance, high cleanliness, etc. For the piping materials satisfying these requirements, fluorine resin, such as PFA (PerFluoroAlkoxyethylene copolymer resin), is suitable.

Piping constituting manufacturing lines in these industries is composed of joints made of thermoplastic resin including PFA resin or the joint and a tube etc. to be butt welded at their respective end faces in some cases.

When butt-welding the pipe end faces of joints or tubes etc. (hereinafter referred to as workpieces) made of thermoplastic resin, a welding method includes coaxially positioning pipe end faces of the workpieces disposed on the opposite sides of a heater in a non-contact state, heating the pipe end faces by heat of the heater to be in an appropriate molten state, and then thrusting the pipe end faces against each other.

Figure 9:
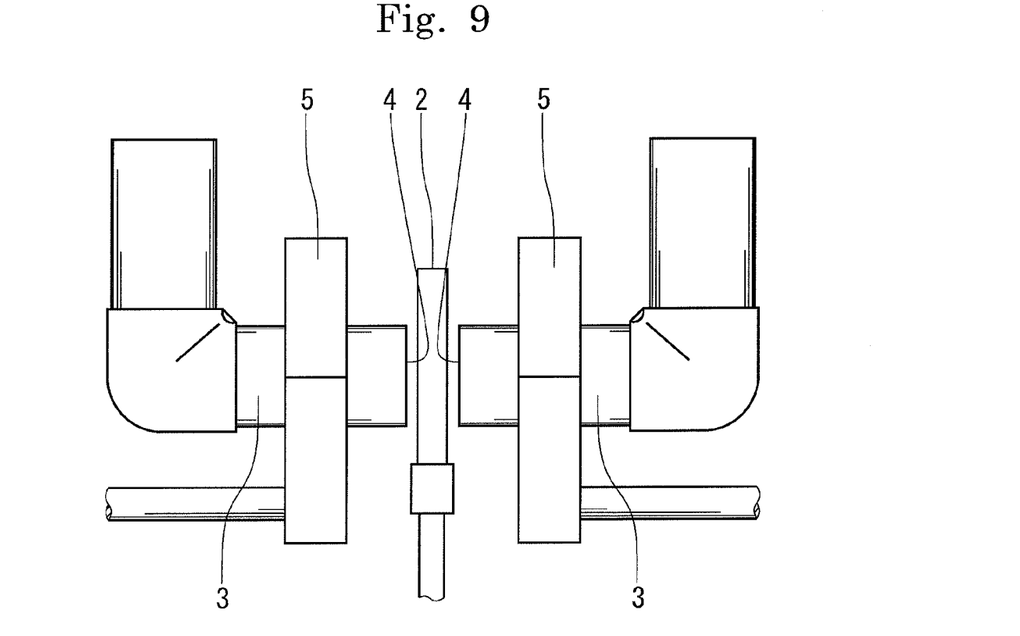
FIG. 9 is a view showing a state in which conventional resin joints to be welded to each other are grasped tightly held with clamps.

As a device for welding the pipe end faces of the workpieces to each other using this method, the welding machine of JP HEI 8-156102 A has been known in the art. This welding machine 1 comprises, as shown in FIG. 9, a heater 2 on the opposite sides of which a pair of workpieces 3, 3 to be welded in a non-contact state are disposed. A pair of clamps 5, 5 are disposed on the opposite sides of the heater 2 for grasping and tightly holding the workpieces 3, 3. The workpieces are fixed with an appropriate distance therebetween so as not to bring pipe end faces 4, 4 of the workpieces 3, 3 into contact with the heater 2 at the time of heating and melting. At least one of the pipe end faces 4, 4 is moved coaxially after the pipe end faces 4, 4 of the workpieces 3, 3 to be heated and melted are brought to an appropriate molten state, and the pipe end faces 4, 4 of the workpieces 3, 3 are thrust against each other to be welded Introduced in JP 2004-216859 A is a welding method for welding workpieces to each other using the welding machine to prevent harmful inner face beads.

In the welding machine of JP HEI 8-156102 A and welding method of JP 2004-216859 A, when welding ring parts of a resin joint are short in length and have a short cylindrical shape, it is impossible to ensure a sufficient clamping margin for tightening and fixing the welding ring parts with clamps. Therefore, it is impossible to tighten and fix the welding ring parts with the clamps, and it is necessary to fix the resin joint per se to the welding machine using a special jig for fixing. However, use of the special jig for fixing the resin joint to the welding machine makes the laying operation cumbersome, takes much time to align the centers of the pipe end faces of the joints, and possibly induces position aberration at the welding parts of the joints.

Thus, a resin joint capable of solving these problems, melting by heat the pipe end faces with high precision to be welded to each other, has been desired.

SUMMARY OF THE INVENTION

The present invention has been developed in order to solve the aforementioned problems. The object of the invention is to provide a resin end fact butt joint, a method for welding the joint, and a piping member, with which it is possible to ensure a sufficient clamping margin with the clamp of an ordinary welding machine, and to ensure an appropriate distance between the centers even when joints having short tubular welding ring parts are welded. With the present invention, it is possible to align the centers by positioning the centers along the same axis.

To attain the above object, a resin end-face butt joint comprises a joint base part provided therein with a flow path, multiple welding ring parts provided on the joint base part and communicating with the flow path in the joint base part, and fastening parts provided at an outer end of the joint base part for clamping a welding machine so as to be coaxial with at least one of the welding ring parts.

In the aforementioned resin end-face butt joint, the welding ring parts can have a short tubular shape, and the fastening parts coaxial with the welding ring parts have a circular shape having an outside diameter identical with an outside diameter of the welding ring parts.

In the aforementioned resin end-face butt joint, the welding ring parts provided on the joint base part can have any one of shapes consisting of an elbow shape, a T-shape and an angled T-shape.

In addition, a method for welding resin end-face butt joints comprises projectingly forming circular fastening parts integrally on an outer end of a joint base part so as to be coaxial with welding ring parts provided on the joint base part. The fastening parts are grasped and tightly held with a clamp of a welding machine, end faces of the welding ring parts are heated and melted with a non-contact heater, and the welding ring parts are thrust against each other to weld the end faces to each other.

In the aforementioned method, fastening parts of the resin joints can be grasped and tightly held with the clamp, and the method comprises shortest welding that welds the welding ring parts having a short tubular shape at a shortest core interval dimension.

In the aforementioned method, workpieces can be welded to each other, one of which is an end face of the welding ring part having the short tubular shape and having the fastening parts grasped and tightly held with the clamp, and the other of which is an end face of a tube, a pipe end face of a mechanical joint or a connection end face of a valve, a pressure or flow rate sensor or a filter.

A piping member constructed through a welding method comprises fastening a resin end-face butt joint to a welding machine, with fastening parts grasped and tightly held with a clamp. The resin end-face butt joint comprises a joint base part provided therein with a flow path, multiple welding ring parts provided on the joint base part and communicating with the flow path in the joint base part, and fastening parts provided at an outer end of the joint base part for clamping a welding machine so as to be coaxial with at least one of the welding ring parts.

Effects of the Invention

According to the invention, since holding and fixing can be attained coaxially and at an appropriate core interval dimension with the clamp of an ordinary welding machine without use of a fixing jig, joints made of various kinds of thermoplastic resins and provided with the welding ring part having the short tubular shape can be infallibly welded with ease. Particularly, it is possible to perform the shortest welding of two joints to each other, thereby enabling the device per se to be downsized and enabling remarkable contribution to reduction in size and compactness of a piping space.

According to the invention, since the fastening part can have a circular shape of an outside diameter identical with the outside diameter of the welding ring part, coaxial tightening and fixing can be attained with the clamp of an ordinary welding machine without necessitating a special jig. Furthermore, since a fixing margin that is the length of the fixing width can sufficiently be secured, construction property and workability are remarkably good.

According to the invention, the invention is applicable to various kinds of joints having an elbow shape, T-shape, angled T-shape, etc.

According to the invention, even when the welding ring part has a short tubular shape and a dimension unable to secure the length of the fixing margin, it is possible to provide a welding method easily enabling tightening and fixing with the clamp of an ordinary welding machine, enabling fixing at an appropriate core interval dimension, enabling coaxial retaining infallibly, enabling core alignment with ease without inducing a position gap.

According to the invention, since two joints each provided with the welding ring part having a short tubular shape can be welded to each other with exactitude, a joint member having the shortest core interval dimension can easily be constructed to contribute remarkably to compactness.

According to the invention, not only two joints, but also a joint and a tube or mechanical joint or a joint and a workpiece such as a valve can infallibly be welded to each other, with the fastening part of the joint provided with the welding ring part having the short tubular shape tightened and fixed.

According to the invention, since it is possible to provide a piping member having two joints, a joint and a tube or mechanical joint, or a joint and a workpiece such as a valve welded to each other, it is possible to downsize a drug solution providing device, for example, and to reduce in piping space, thereby enabling remarkable contribution to compactness and enabling stable welding working to be performed.

DETAILED DESCRIPTION OF THE INVENTION

Figure 1:
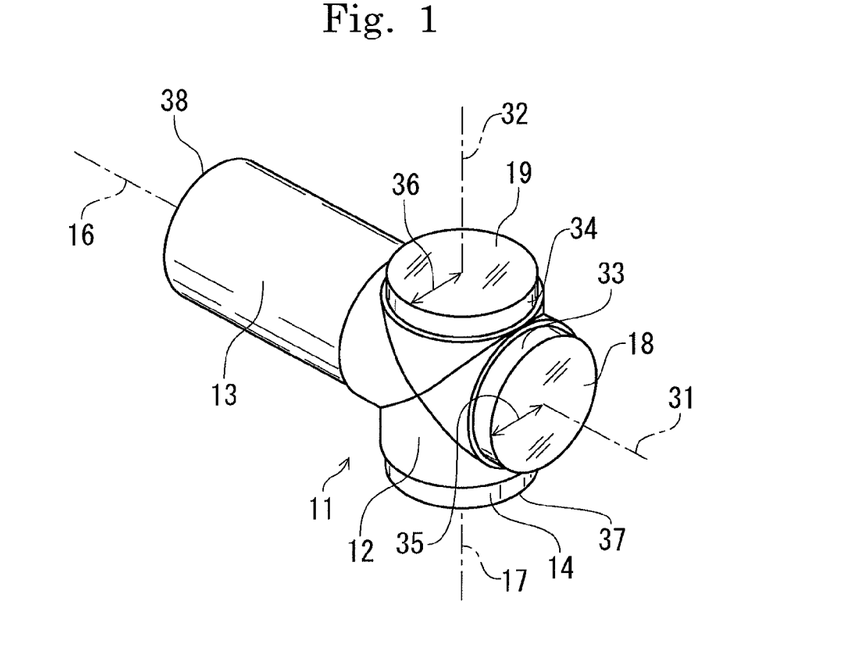
FIG. 1 is a perspective view showing an elbow-shaped joint of a resin end face butt joint according to the present invention.
Figure 2:
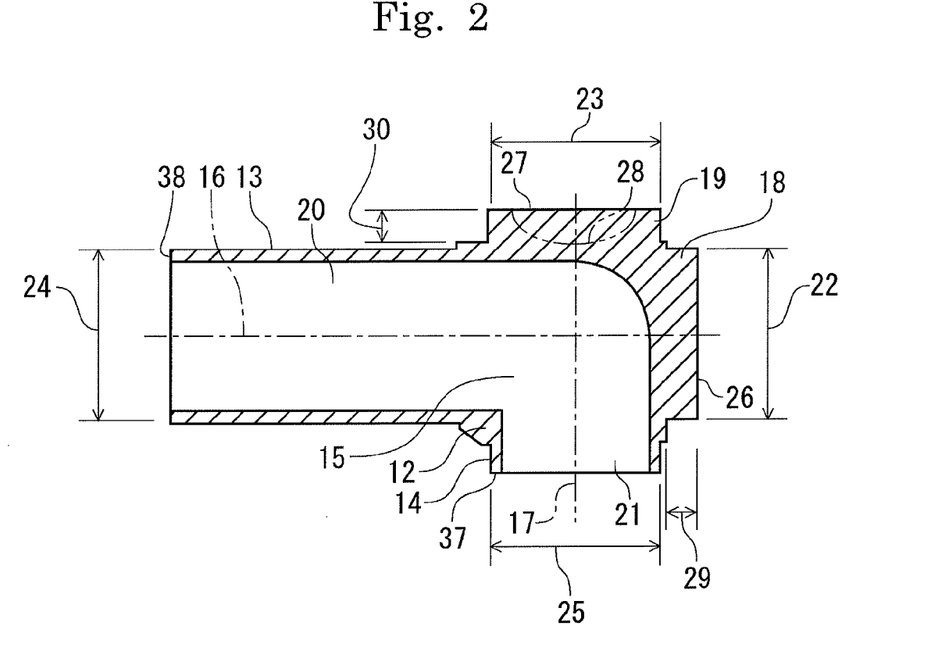
FIG. 2 is a cross section of FIG. 1.

An embodiment of the resin end-face butt joint according to the present invention will be described in detail hereinafter with reference to the drawings. FIGS. 1 and 2 show an elbow-shaped joint of the resin end-face butt joint according to the present invention, FIG. 1 being a perspective view of the joint seen from obliquely upward and FIG. 2 being a cross section of the joint.

The resin joint is made of thermoplastic resin. The thermoplastic resin includes fluorine resins including PFA, PTFE, FEP, ETFE, PVDF, PVF, PCTFE and ECTFE, vinylidene chloride, vinyl chloride, vinyl acetate, polyvinyl alcohol, styrol, ABS, polycarbonate, polyethylene, super-high-molecular polyethylene, polypropylene, acryl, butyrate, acetate, polyamide, polyacetal, AS, vinylidene fluoride, etc. The resin end-face butt joint in the present invention is made of PFA.

In FIG. 1, an elbow-shaped joint 11 of the resin end-face butt joint comprises a joint base part 12 provided therein with a flow path 15, a welding ring part 13 for welding a workpiece, and a short tubular welding ring part 14.

The joint base part 12 is provided on the outer ends thereof respectively with projecting fastening parts 18, 19 to be grasped and tightly held with clamps of a welding machine, and which are coaxial respectively with central axes 16, 17 of the welding ring parts 13, 14.

The welding ring parts 13, 14 are provided to begin at the joint base part 12. The welding ring parts 13, 14 are provided therein with flow paths 20, 21, and the flow parts 20, 21 communicate with the flow path 15 formed in the joint base part 12.

In the figure, the welding ring part 13 has a long tubular shape and the welding ring part 14 has a short tubular shape. The construction of the joint 11 is not limited to this configuration. For example, both the welding ring parts 13, 14 may be formed in the long tubular shape and, in use, an appropriately selected one of the welding ring parts may be cut to a predetermined short length. Otherwise, both the welding ring parts 13, 14 may be formed in the short tubular shape.

The fastening parts 18, 19 provided on the outer ends of the joint base part 12 are circular in shape and have outside diameters 22, 23 identical to outside diameters 24, 25 of the welding ring parts 13, 14, respectively. As indicated in the cross-sectional view of FIG. 2, each of the fastening parts 18, 19 is a blank preventing flow therethrough (i.e., there is no flow path through the fastening parts 18, 19 unlike the welding ring parts 13, 14). While it is necessary that the projecting fastening parts 18, 19 have circular cylindrical circumferences for being infallibly grasped and tightly held with the clamps of the welding machine, it is not always necessary that tops 26, 27 of the fastening parts 18, 19 have flat surfaces. For example, as shown by a two-dot chain line 28 at the fastening part 19 in FIG. 2, the top of the fastening part 19 may be concave. That is to say, in this case, it becomes possible to achieve material savings and weight reduction.

The joint 11 in the present embodiment is formed under the same standards as the conventional resin joint except that the joint base part 12 is provided at the outer ends thereof with the fastening parts 18, 19 coaxial with the welding ring parts 13, 14. However, this is not limiting. Incidentally, in the present embodiment, the nominal diameter of the welding ring parts 13, 14 is set to be 25.4 mm (1 inch).

It is necessary that the fastening parts 18, 19 have sufficient height for the purpose of being infallibly grasped and tightly held with the clamps of the welding machine. The fastening margin generally falls in the range of 6 to 15 mm. However, it is unnecessary that heights 29, 30 of the fastening parts 18, 19 be equal to the width of the clamps. The heights capable of infallibly fastening the joint without being wobbled when the fastening parts have been grasped and tightly held with the clamps will suffice.

Even when the height of the fastening parts 18, 19 is set to be sufficiently smaller than the size of the entire joint, since the joint can infallibly be grasped and tightly held with clamps, projections produced on the outside of the joint base part can be minimized. For this reason, since the fastening parts do not interfere with other workpieces, compact piping can be constructed.

In addition, since the fastening parts 18, 19 are disposed on the outer ends of the joint base part 12, since the distance from the surface of the heater to the fastening parts 18, 19 is not so different from the distance from the surface of the heater to the clamp grasping part of the welding ring part in the case of welding the conventional joints, an appropriate dimension between the centers is secured.

Since the outside diameter 22, 23 of the fastening parts 18, 19 is identical to the outside diameters 24, 25 of the welding ring parts 13, 14, the clamps capable of grasping and tightly holding the welding ring parts 13, 14 can be used without modification. Therefore, when using a resin end-face butt joint, it is unnecessary to newly prepare clamps different in size from the conventional clamps.

As shown in FIG. 2, the fastening part 18 of the joint 11 projects from the outer end of the joint base part 12 in a direction opposite to the respective welding ring part 13 so as to be coaxial with the center axis 16 of the welding ring part 13 and have a cylindrical shape having an outside diameter identical to the outside diameter 24 of the welding ring part 13. As a result, the positional relation between the welding ring part 13 and the welding machine when the fastening part 18 has been grasped and tightly held with the clamp of the welding machine is the same as the positional relation between the welding ring part 13 and the welding machine when the welding ring part 13 has been grasped and tightly held with the clamp.

In the welding machine, when the workpiece to be welded is grasped and tightly held with the clamp, the central axis of the workpiece is coincident with the shaft center of the welding machine. Therefore, when the fastening part 18 of the joint 11 has been grasped and tightly held with the clamp, the central axis 16 of the welding ring part 13 (in which the fastening part is coaxial with the center axis 16) is coincident with the shaft center of the welding machine.

The aforementioned relationship is also retained with respect to the fastening part 19 disposed on the outer end of the joint base part 12 so as to be coaxial with the central axis 17 of the welding ring part 14.

Therefore, even when the welding ring part 14 which cannot secure a sufficient fastening margin for the clamp due to a short tubular shape is welded to the workpiece, merely by grasping and holding the fastening part 19 with the clamp, the welding ring part 14 can be attached to the welding machine, with the central axis 17 of the welding ring part 14 in alignment with the shaft center, thus enhancing the workability remarkably.

In addition, when the workpiece is welded to a short tubular welding ring part such as the welding ring part 14, since the beads of the welding part can be positioned in the vicinity of the resin joint, the beads do not hinder the attachment of a piping support, sensor, etc. to contribute to compactness of the piping Furthermore, since the fastening parts 18, 19 have a circular shape, as shown in FIG. 1, radial distances 35, 36 between central axes 31, 32 of the fastening parts 18, 19 and outer circumferences 33, 34 of the fastening parts are constant. Accordingly, when grasping and tightly holding the fastening part 19 with the clamp and welding the workpiece to an end part 37 of the welding ring part 14, even in the case where the welding ring part 13 is rotated about the central axis 17 and the fastening part 19 is grasped and tightly held with the clamp, with an end part 38 of the welding ring part 13 directed in any direction, the central axis 17 of the welding ring part 14 coaxial with the fastening part is coincident with the shaft center of the welding machine.

Therefore, even when the resin elbow-shaped joint 11 is rotated about the central axis of the welding ring part 14 by an appropriate angle relative to the workpiece to be welded, since a central axis of the workpiece to be welded is in agreement with the central axis 17 of the welding ring part 14 of the resin joint 11, no crisscross is induced in the welding part. For this reason, since the resin joint 11 can be welded to the workpiece to be welded at an voluntary rotation angle without limitation to a welding angle, it is possible to compactly construct the piping, with the length of the piping to be used set to be minimum and to arbitrarily weld the joint having free directionality.

Figure 3:
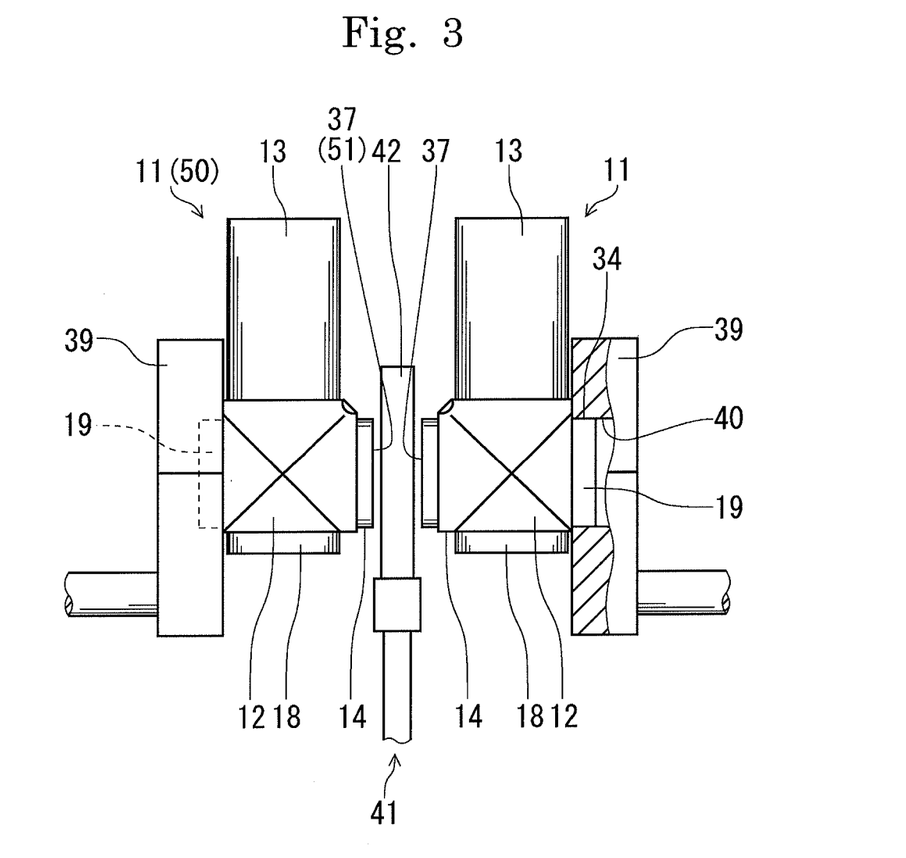
FIG. 3 is an explanatory front view showing a state in which the joints of FIG. 1 are welded to each other in a shortest distance.
Figure 4:
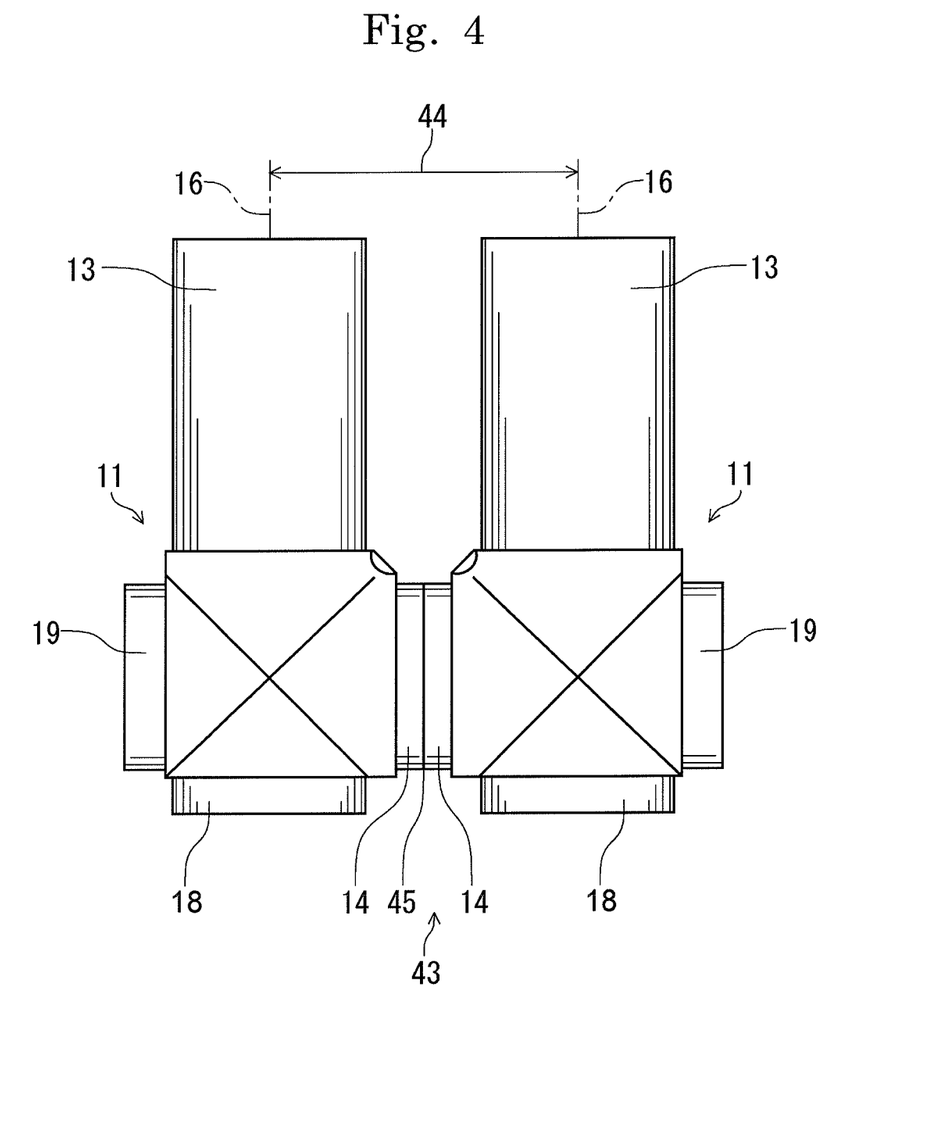
FIG. 4 is an enlarged front view showing a piping member having the joints of FIG. 3 welded to each other.

In FIG. 3 and FIG. 4, when two resin joints 11 are welded to each other at the welding ring parts 14 having a short tubular shape, the resin joints 11 can be welded to each other at a shortest core interval dimension. In this case, since it is impossible to grasp and hold the welding ring part 14 of the resin joint 11 with the clamp 39, as shown in FIG. 3, by grasping the outer circumference 34 of the fastening parts 19, 19 of the resin joints 11, 11 with a grasping surface 40 of the clamp 39, it is possible to fix the end parts 37, 37 of the welding ring parts 14, 14 face-to-face in a non-contact state relative to a heater 42 of a welding machine 41 on the opposite sides of the heater 42. At this time, the center axes of the welding ring parts 14, 14 of the pair of resin joints 11 are in agreement with each other as described earlier by simply grasping and tightly holding the fastening parts 19, 19 of the resin joints 11, 11 with the clamps 39, 39.

Shown in FIG. 4 is a piping member 43 prepared by welding the resin joints 11 to each other at the shortest core interval dimension. Thus, since the piping member can be formed at the shortest core interval dimension, use of the piping member 43 enables the piping of a device to be compactly constructed.

In addition, since it is possible to weld the welding ring parts 14, 14 to each other with their central axes in perfect agreement with each other, it is possible to simply manufacture a high-quality piping member without forming any difference in level on a welded part 45, hindering liquid smooth flowing, producing a pool of liquid and inducing detention and detachment of particles.

Figure 5:
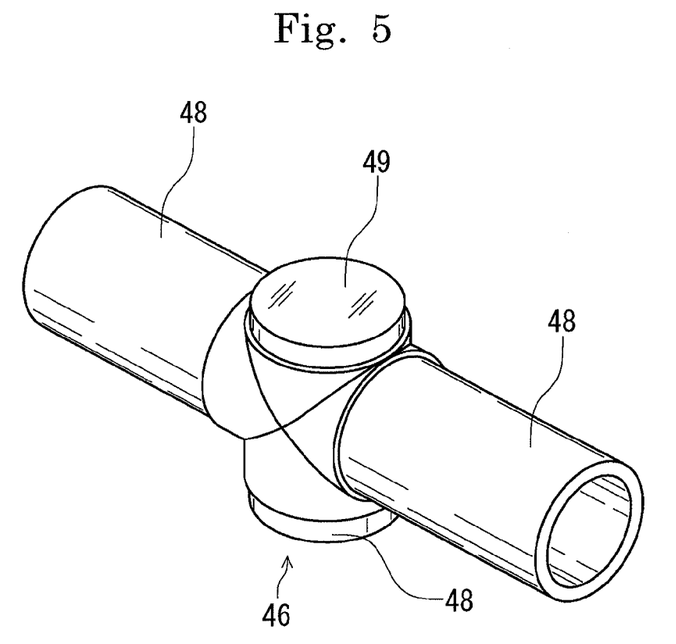
FIG. 5 is a perspective view showing a T-shaped joint of the resin end face butt joint according to the present invention.
Figure 6:
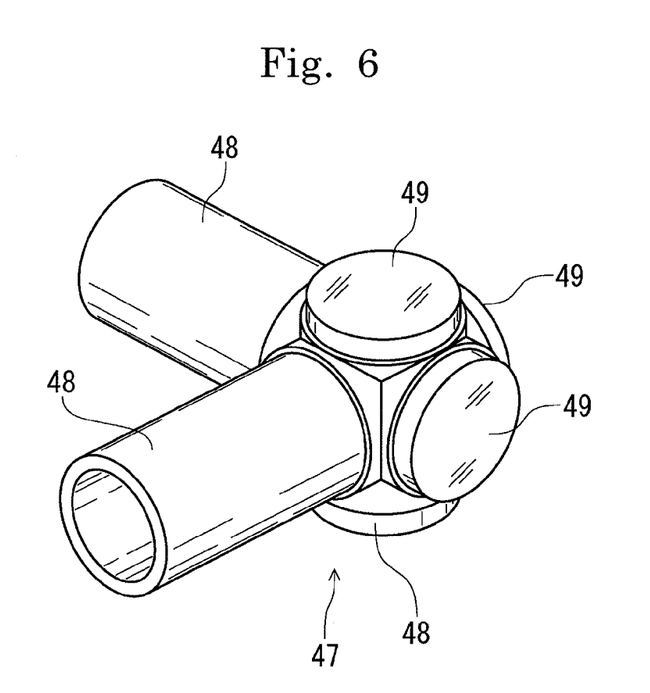
FIG. 6 is a perspective view showing an angled T-shaped joint of the resin end face butt joint according to the present invention.

The present invention is not limited to the application to the elbow-shaped resin joint 11 of the present embodiment, and is also applicable to a joint comprising a joint base part provided therein with a flow path, multiple welding ring parts provided on the joint base part and communicating with the flow path in the joint base part, and fastening parts provided at an outer end of the joint base part for clamping a welding machine so as to be coaxial with at least one of the welding ring parts. For example, the present invention is, of course, applicable similarly to a T-shaped joint 46 shown in FIG. 5 and an angled T-shaped joint 47 shown in FIG. 6. In the T-shaped joint 46 of FIG. 5 and angled T-shaped joint 47 of FIG. 6, one of welding ring parts 48 has a short tubular shape. Similarly to the case of the elbow-shaped joint 11, however, all the welding ring parts 48 may be formed in a long tubular shape and, in use, the welding ring parts 48 to be welded using a fastening part 49 may be cut to a predetermined short length. Otherwise, all the welding ring parts 48 to be welded using the fastening part 49 may be formed in a short tubular shape. Selection of any of these is arbitrary depending on exploitation.

Next, an example of a welding method of an end-face butt joint in the present invention will be described.

At first, the joint 11 having the circular fastening part 19 protrudingly provided integrally on the outer end of the joint base part 12 so as to be coaxial with the welding ring part 14 provided on the joint base part and a workpiece 50 to be welded to the joint 11 are prepared. The fastening part 19 of the joint 11 projects outwardly from the joint base part 12 only in a direction opposite welding ring part 14 at least by a height capable of allowing the butt joint 11 to be fixed through grasping and tightly holding with the clamp 39 of the welding machine 41, as shown in FIG. 3. The workpiece 50 is simultaneously fixed through grasping and tightly holding with the clamp 39 so that the joint and workpiece 50 are disposed face-to-face across the heater 42 of the welding machine 41.

The end part 37 of the joint 11 to be welded and an end face 51 of the workpiece 50 to be welded are heated in a state of non-contact with the heater to be melted. After the end part 37 of the joint 11 and the end face 51 of the workpiece 50 are sufficiently melted by heat, the end part and end face are thrust against each other to be welded to each other.

In the welding method of the end-face butt joint according to the present invention, even when it is impossible for the welding ring part 14 of the joint 11 to provide a fixing margin for tightening and securing with the clamp 39, it is unnecessary to prepare an exclusive jig for grasping and tightly holding the joint per se as in the conventional welding method. Instead, by grasping and tightly holding the fastening part 19 externally provided on the joint base part 12 so as to be coaxial with the welding ring part 14 to be welded using the conventional clamp 39, the joint 11 can be fixed to the welding machine 41, thus enhancing the working efficiency remarkably.

In addition, when the fastening part 19 provided on the outer end of the joint base part 12 is grasped and tightly held with the clamp 39 so as to be coaxial with the welding ring part 14 to be welded, the welding ring part 14 can be fixed, with the centers thereof and the welding machine 41 in alignment with each other. Therefore, it is unnecessary to perform the cumbersome center alignment having conventionally taken a long time, and the welding working of the joint can accurately be performed for a short period of time.

The substantial difference between the case where the end-face butt resin joint of the present invention is welded by the welding method of the present invention and the case where the conventional resin joint is welded by the conventional welding method is only the step of the present invention that grasps and holds the fastening part of the end-fact butt resin joint with the clamp and fixes it to the welding machine. The remaining steps have no difference from those in the case where the conventional resin joint is welded by the conventional welding method. Therefore, any worker mastering the conventional welding method can perform the welding working without receiving any specialized training by rather simply and infallibly using the conventional welding machine and clamp, resulting in an extremely increase in economical value.

The above-described joint welding method is not limited to welding of the end-face butt joint of the present invention to a specific workpiece, but is applicable to welding thereof to various workpieces as described next.

Figure 7:
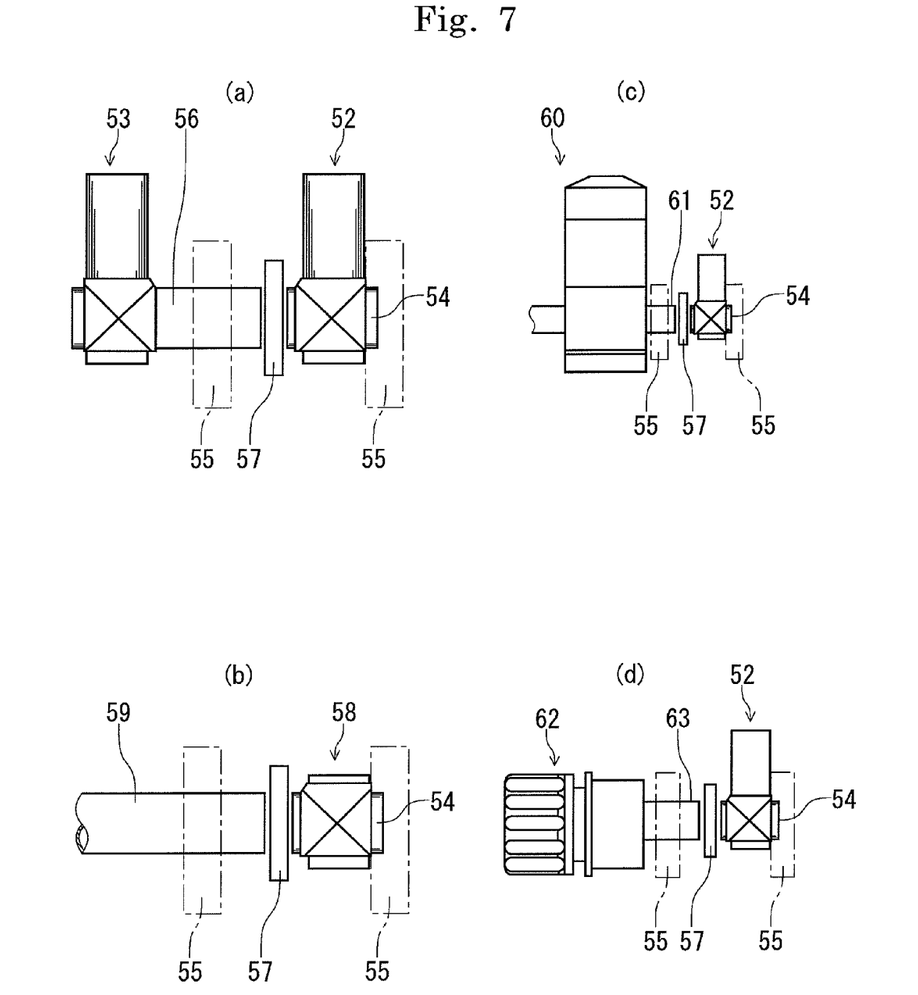
FIG. 7(a) is an explanatory view showing a state in which a joint having short tubular shaped welding ring parts and an elbow joint are welded to each other.
FIG. 7(b) is an explanatory view showing a state in which a joint having short tubular shaped welding ring parts and a tube are welded to each other.
FIG. 7(c) is an explanatory view showing a state in which a joint having short tubular shaped welding ring parts and a pipe of a valve are welded to each other.
FIG. 7(d) is an explanatory view showing a state in which a joint having short tubular shaped welding ring parts and a pipe of a mechanical joint are welded to each other.

When a joint 52 provided with the welding ring part having a short tubular shape and an elbow-shaped joint 53 are to be welded as shown in FIG. 7(a), a fastening part 54 of the joint 52 provided with the welding ring part having the short tubular shape is grasped and tightly held with a clamp 55 and a welding ring part 56 of the elbow-shaped joint 53 having a long tubular shape is grasped and tightly held with the clamp 55. The fastening part and the welding ring part are disposed face-to-face across a heater 57, and their end faces are heated and melted, so that these may be welded to each other.

When a joint 58 provided with the welding ring part having a short tubular shape and a tubular part, such as a tube or pipe (hereinafter referred to as the "tube") 59 are to be welded as shown in FIG. 7(b), a fastening part 54 of the joint 58 provided with the welding ring part having the short tubular shape is grasped and tightly held with the clamp 55 and the tube 59 is grasped and tightly held with the clamp 55 at an appropriate position. The fastening part and the tube are disposed face-to-face across a heater 57 and their end faces are heated and melted, so that these may be welded to each other.

When the joint 52 provided with the welding ring part having the short tubular shape and a tube 61 of a valve 60 are to be welded, as shown in FIG. 7(c), the fastening part 54 of the joint 52 provided with the welding ring part having the short tubular shape is grasped and tightly held with the clamp 55 and the tube 61 of the valve 60 is grasped and tightly held with the clamp 55. The fastening part and the tube are disposed face-to-face across the heater 57 and their end faces are heated and melted, so that these may be welded to each other.

When the joint 52 provided with the welding ring part having the short tubular shape and a tube 63 of a mechanical joint 62 are to be welded as shown in FIG. 7(d), the fastening part 54 of the joint 52 provided with the welding ring part having the short tubular shape is grasped and tightly held with the clamp 55 and the tube 63 of the mechanical joint 62 is grasped and tightly held with the clamp 55. The fastening part and the tube are disposed face-to-face across the heater 57 and their end faces are heated and melted, so that these may be welded to each other.

The resin end-face butt joint and method for welding the joints according to the present invention is not limited to welding of the joints to each other, but can manufacture various piping members having the joint and a tube, the joint and the mechanical joint, the joint and a valve, or various kinds of sensors or a filter welded to each other. By using an appropriately selected combination, since it is possible to eliminate the unnecessary welding ring part etc. of the joint and construct piping only of really necessary parts, it is possible to realize small-sized piping of a drug solution providing device etc., for example.

Figure 8:
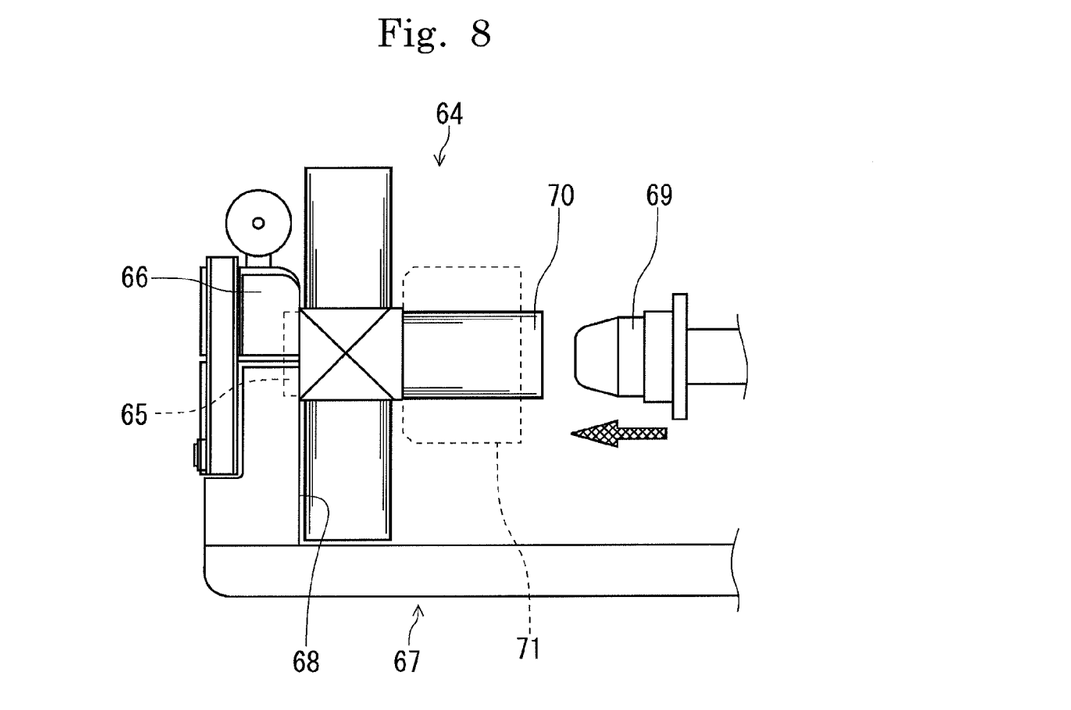
FIG. 8 is an explanatory view showing a state in which fastening parts of the joint in the present invention are grasped tightly held with an exclusive jig for press fit of a sleeve and the sleeve is press-fit constructed.

In addition, as shown in FIG. 8, a fastening part 65 of a joint 64 according to the present invention is used in a different manner from the present embodiment. In particular, with the fastening part 65 grasped and tightly held with a clamp 66, a sleeve 69 can be inserted under pressure into a welding ring part 70. Furthermore, the fastening part 65 can be pressed against and fixed to a flat abutting surface 68 of an exclusive sleeve jig 67 or the like. Since the joint 64 is stabilized without being moved even when a force is applied to the joint at the time of the pressure insertion of the sleeve 69, the sleeve 69 can easily be inserted under pressure into the welding ring part 70, thereby enabling the workability to be enhanced. Incidentally, reference numeral 71 in the figure denotes a union nut.

As described in the foregoing, the case of welding the resin joint of the present invention using the welding method of the present invention not only enables the welding process to be efficiently and accurately performed in comparison with the case of welding the conventional resin joint using the conventional welding method, but also avoids any new working training. In addition, since the welding process can be performed with the conventional welding machine and clamp, no economical load is exerted to thereby extremely enhance the industrial utility value and economical value.

EXPLANATION OF REFERENCE NUMERAL

11 elbow-shaped joint
12 joint base part
13, 14, 48, 56, 70 welding ring parts
18, 19, 49, 54, 65 fastening parts
39 clamps
41 welding machine
42 heater
43 piping member
46, 64 T-shaped joints
48 angled T-shaped joint

The invention claimed is:

1. A resin end-face butt joint comprising:
a joint base part having a flow path therein;
a plurality of welding ring parts on said joint base part and communicating with the flow path in said joint base part; and
a fastening part at an outer end of said joint base part for allowing a welding machine to clamp thereon, said fastening part having a circular cylindrical circumference and being a blank preventing flow therethrough and projecting outwardly from said joint base part only in a direction opposite one of said welding ring parts at least by a height capable of fastening the butt joint with a clamp of the welding machine so as to be coaxial with a central axis of said one of said welding ring parts.

2. The resin end-face butt joint according to claim 1, wherein said welding ring parts are arranged on said joint base part so as to form any one of an elbow shape, a T-shape, and an angled T-shape.

3. A piping member comprising said end-face butt joint according to claim 2.

4. A piping member comprising said end-face butt joint according to claim 1.

5. The resin end-face butt joint according to claim 1, wherein said fastening part is a first fastening part of a plurality of fastening parts formed on said joint base part, each of said fastening parts projecting outwardly from said joint base part in a direction opposite a respective one of said welding ring parts so as to be coaxial with a central axis of said respective one of said welding ring parts.

6. A resin end-face butt joint comprising:
a joint base part having a flow path therein;
a plurality of welding ring parts on said joint base part and communicating with the flow path in said joint base part; and
a fastening part at an outer end of said joint base part for allowing a welding machine to clamp thereon, said fastening part being a blank preventing flow therethrough and projecting outwardly from said joint base part in a direction opposite one of said welding ring parts so as to be coaxial with a central axis of said one of said welding ring parts;
wherein at least one of said welding ring parts has a short tubular shape, and said fastening part has a cylindrical shape having an outside diameter identical to an outside diameter of said at least one of said welding ring parts having a short tubular shape.

7. The resin end-face butt joint according to claim 6, wherein said welding ring parts are arranged on said joint base part so as to form any one of an elbow shape, a T-shape, and an angled T-shape.

8. A piping member comprising said end-face butt joint according to claim 6.

9. A method of welding resin end-face butt joints, said method comprising:
forming a cylindrical fastening part integrally on an outer end of a joint base part so that the fastening part is a blank preventing flow therethrough and projects outwardly from the joint base part in a direction opposite one of a plurality of welding ring parts formed on the joint base part so that the fastening part is coaxial with a central axis of the one of the plurality of welding ring parts;
grasping and holding the fastening part with a clamp of a welding machine;
heating and melting end faces of a welding ring part of the joint base part and an adjacent welding ring part using a non-contact heater; and
thrusting the melted end faces of the welding ring part of the joint base part and the adjacent welding ring against each other to weld the end faces to each other.

10. The method according to claim 9, wherein said heating and melting end faces of the welding ring part of the joint base part and an adjacent welding ring part comprises welding the welding ring part of the joint base part having a shortest tubular shape with a shortest core interval dimension.

11. The method according to claim 10, wherein said heating and melting end faces of the welding ring part of the joint base part and an adjacent welding ring part further comprises welding an end face of one of a tube, a pipe end face of a mechanical joint, a connection end face of a valve, an end face of a pressure or flow rate sensor, or an end face of a filter to the welding ring part of the joint base part having the shortest tubular shape with the shortest core interval dimension.

12. A piping member constructed of the welding resin end-face butt joints formed by said method of claim 10.

13. The method according to claim 9, wherein said heating and melting end faces of the welding ring part of the joint base part and an adjacent welding ring part comprises welding (i) the welding ring part of the joint base part having a shortest tubular shape with a shortest core interval dimension, and (ii) an end face of one of a tube, a pipe end face of a mechanical joint, a connection end face of a valve, an end face of a pressure or flow rate sensor, or an end face of a filter.

14. A piping member constructed of the welding resin end-face butt joints formed by said method of claim 13.

15. A piping member constructed of the welding resin end-face butt joints formed by said method of claim 9.

16. The method according to claim 9, wherein said forming a cylindrical fastening part integrally on the outer end of the joint base part comprises forming a plurality of fastening parts on the joint base part, of which the fastening part is one of the plurality of fastening parts formed on the joint base part, each of said fastening parts being formed to project outwardly from the joint base part in a direction opposite a respective one of the welding ring parts so as to be coaxial with a central axis of the respective one of the welding ring parts.

* * * * *